(12) United States Patent
Nishiyama et al.

(10) Patent No.: US 6,333,386 B1
(45) Date of Patent: Dec. 25, 2001

(54) RUBBER COMPOSITION, HOSE OF LOW FUEL PERMEATION, AND ELECTROCONDUCTIVE HOSE OF LOW FUEL PERMEATION

(75) Inventors: Takahiro Nishiyama, Kasugai; Shinobu Kanbe, Komaki; Atsuo Miyajima, Inuyama; Kazuhiro Kato, Nagoya, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/604,581

(22) Filed: Jun. 27, 2000

(30) Foreign Application Priority Data

Jun. 28, 1999 (JP) .................................................. 11-182463
Jun. 28, 1999 (JP) .................................................. 11-182476
Apr. 25, 2000 (JP) .................................................. 12-128939
Apr. 25, 2000 (JP) .................................................. 12-128943

(51) Int. Cl.[7] .............................. C08L 9/00; C08L 27/04; C08L 33/00; C08L 33/14

(52) U.S. Cl. ........................ 525/213; 525/214; 525/217; 525/232; 525/233; 525/235; 525/238; 525/239; 524/847; 524/849

(58) Field of Search .................................... 525/213, 214, 525/217, 232, 233, 238, 239; 524/847, 849

(56) References Cited

U.S. PATENT DOCUMENTS 6,043,318 * 3/2000 Hardiman et al. .................... 525/197

FOREIGN PATENT DOCUMENTS

| 4-171381 | 6/1992 | (JP) . |
| 11-300892 | 11/1999 | (JP) . |
| 11-304058 | 11/1999 | (JP) . |
| 99/54132 | 10/1999 | (WO) . |

* cited by examiner

*Primary Examiner*—Nathan M. Nutter
(74) *Attorney, Agent, or Firm*—Jacobson Holman, PLLC

(57) ABSTRACT

A relatively small amount of a plasticizer having an SP value of at least 8.8 and a molecular weight of at most 550 is added to blend rubber of NBR-PVC in which NBR has an AN content of from 43 to 50% by weight. The fuel impermeability and the low-temperature flexibility of the resulting rubber composition are improved to be comparable to those of FKM, and the amount of the plasticizer and its reaction product to be released from the rubber composition in fuel is reduced. Adding a controlled amount of carbon black to the rubber composition makes the composition have favorable electroconductivity. The rubber composition is formed into hoses or electroconductive hoses of low fuel permeation.

20 Claims, 2 Drawing Sheets

RUBBER COMPOSITION, HOSE OF LOW FUEL PERMEATION, AND ELECTROCONDUCTIVE HOSE OF LOW FUEL PERMEATION

RELATED APPLICATION

This application is directed to subject matter related to that of a concurrently-filed, commonly-assigned application Ser. No. 07/604,580.

BACKGROUND OF THE INVENTION

1. Field of the Invention

This invention relates to a rubber composition, a hose of low fuel permeation, and an electroconductive hose of low fuel permeation. More particularly, it relates to a rubber composition of good fuel impermeability and low-temperature flexibility, and a hose of low fuel permeation utilizing this rubber composition, and also to a rubber composition of good fuel impermeability, low-temperature flexibility and electroconductivity, and an electroconductive hose of low fuel permeation utilizing this rubber composition.

2. Description of the Related Art

Control on the leakage of fuel by permeation from an automobile, which is similar to the SHED control (Shield Housing for Evaporative Determinations) in the United States, is put into practice in Japan and Europe in 2000 A.D. A fuel transporting hose is required to be highly impermeable to fuel, since it is greatly responsible for the leakage of fuel by permeation from an automobile, as is well known.

In Japan and Europe, NBR (acrylonitrile-butadiene rubber) or blend rubber of NBR and PVC (polyvinyl chloride) of general specifications is used for a fuel hose in an automobile, such as a filler, breather or evaporation hose. However, that type of hose fails to achieve any fuel impermeability conforming to the strengthened domestic control as stated above. In addition, the rubber material noted above often releases a plasticizer, a vulcanizing agent or its reaction product, when dipped in fuel. In particular, the vulcanizing agent or its reaction product, if released, will corrode the metallic members of a fuel pump or will clog the valves in fuel piping.

In the United States in which the SHED control is already in force, FKM (fluororubber) or resin is used for the inner layer of a hose, and NBR-PVC (blend rubber of NBR and PVC), ECO (epichlorohydrin rubber), CSM (chlorosulfonated polyethylene rubber), etc. for its outer layer. These United States specifications can be expected to achieve the fuel impermeability conforming to the control. There are, however, problems, since FKM and fluororesins are expensive, and the inner layer of FKM or resin is difficult to bond to the outer layer.

It has heretofore been said that increasing the AN content (combined acrylonitrile content) of NBR in NBR-PVC to a range falling between 36 and 42% by weight or so could improve the fuel swelling resistance of NBR-PVC. The inventors of this invention, however, have found that the fuel impermeability of NBR-PVC in which the AN content of NBR falls within that range is still poor.

The inventors have further found that increasing the AN content of NBR to a range falling between 43 to 50% by weight or so realizes good fuel impermeability of NBR which is comparable to that of FKM.

However, increasing the AN content thereof to such a high level will decrease the low-temperature properties of the rubber material necessary to fuel hoses (for example, the flexibility of hoses used in cold districts where the ambient temperature often reaches −30° C. or so). To improve the low-temperature properties of rubber materials for hoses, in general, the amount of the plasticizer to be added thereto will be increased, which, however, adversely affects the fuel impermeability of the hoses formed of such rubber materials.

Apart from the problems of fuel impermeability and low-temperature flexibility of hoses noted above, it is also advantageous to make fuel hoses have electroconductivity. While an automobile is driven or refueled, fuel flows in the fuel hose to generate static electricity. If kept charged with static electricity, the fuel hose will give sparks dangerous to fuel when it is contacted with a metallic refueling gun or the like. To avoid the dangerous trouble, for example, an earth wire may be disposed between a filler hose and the body of an automobile thereby to remove static electricity through it, which, however, requires some specific members and an additional step for fitting it. It will be rather reasonable to use a filler or breather hose having electroconductivity. However, FKM and fluororesins essentially have large electric resistance, and hoses having the inner layer formed of these materials could hardly have electroconductivity.

SUMMARY OF THE INVENTION

The inventors of this invention have evaluated fuel impermeability and electroconductivity of various types of inexpensive NBR-PVC-based rubber compositions using gasoline for practical use. The gasoline for practical use includes Phase-II gasoline for evaporation control evaluation in the United States, and gasoline for evaporation control evaluation in Europe.

The results of evaluation have revealed that even NBR-PVC can realize a rubber composition having the following properties (1) to (4).

(1) It has fuel impermeability comparable to that of FKM.
(2) It keeps flexibility even at low temperatures.
(3) The release of a vulcanizing agent and its reaction product therein into fuel is reduced.
(4) It will also have good electroconductivity, if desired.

A first aspect of this invention resides in a rubber composition for hoses of low fuel permeation, which comprises NBR having a combined acrylonitrile content (AN content) of from 43 to 50% by weight, PVC blended with the NBR, and a plasticizer having a solubility parameter (SP) value of at least 8.8 and a molecular weight of at most 550 added to the NBR-PVC blend.

In the first aspect, the AN content of NBR in the NBR-PVC blend is controlled to fall between 43 and 50% by weight, and therefore the fuel impermeability of the NBR-PVC blend is comparable to that of FKM. To improve the low-temperature properties of the rubber composition, a plasticizer having an SP value of at least 8.8 and a molecular weight of at most 550 is added to the NBR-PVC blend. The plasticizer having a molecular weight of at most 550 has low viscosity at low temperatures, and therefore significantly improves the low-temperature properties of the NBR-PVC blend. The plasticizer having an SP value of at least 8.8 is highly miscible with the NBR-PVC blend in which NBR has a high AN content, hardly affecting the fuel impermeability of the rubber composition. Accordingly, adding the plasticizer as above to the NBR-PVC blend improves the low-temperature properties of the rubber composition, effectively maintaining the fuel impermeability thereof.

The AN content of smaller than 43% by weight will give the rubber composition of insufficient fuel impermeability; and the AN content of larger than 50% by weight will decrease the low-temperature properties of the rubber composition to such a degree that they cannot be improved even by the addition of a plasticizer. A plasticizer having an SP value of smaller than 8.8 is poorly miscible with NBR-PVC and will bleed out of the rubber composition, which makes it difficult to improve low-temperature properties. A plasticizer having a molecular weight of larger than 550 increases the low-temperature viscosity of the rubber composition, which also makes it difficult to improve low-temperature properties.

In addition to the above, in the first aspect of the invention, the amount of the vulcanizing agent and its reaction product to be released from the rubber composition when dipped in fuel is small. Therefore, hoses formed of the rubber composition are free from the troubles to be caused by the released ingredients that may corrode the metallic members of fuel pumps and may clog the valves in fuel piping.

A second aspect of the invention resides in a hose of low fuel permeation, which comprises the rubber composition of the first aspect.

The advantages of the hose of the second aspect are that it is inexpensive and impermeable to fuel and has good low-temperature properties, and the amount of the vulcanizing agent and its reaction product to be released from it is small. The hose is especially suitable for automobiles.

A third aspect of the invention resides in a rubber composition for electroconductive hoses of low fuel permeation, which comprises NBR having an AN content of from 43 to 50% by weight, PVC blended with the NBR, a plasticizer having an SP value of at least 8.8 and a molecular weight of at most 550 added to the NBR-PVC blend, and carbon black (CB) added to the NBR-PVC blend to lower the volume specific resistance of the blend to at most $10^8$ $\Omega \cdot cm$.

In the third aspect, the AN content of NBR in the NBR-PVC blend is controlled to fall between 43 and 50% by weight, like in the first aspect, and therefore the fuel impermeability of the NBR-PVC blend is comparable to that of FKM. The plasticizer having an SP value of at least 8.8 and a molecular weight of at most 550 added to the NBR-PVC blend improves the low-temperature properties of the rubber composition, and effectively maintains the fuel impermeability thereof. In addition, another advantage of the rubber composition is that the amount of the vulcanizing agent and its reaction product to be released from it into fuel is small. Therefore, hoses formed of the rubber composition are free from the troubles to be caused by the released ingredients that may corrode the metallic members of fuel pumps and may clog the valves in fuel piping.

It is believed that increasing the AN content of NBR will not result in the increase in the volume specific resistance of the rubber composition. Particularly, in the third aspect, CB is added to the rubber composition to thereby lower the volume specific resistance of the composition to at most $10^8$ $\Omega \cdot cm$. Therefore, the rubber composition is hardly charged with static electricity.

A fourth aspect of the invention resides in an electroconductive hose of low fuel permeation, which comprises the rubber composition of the third aspect.

The advantages of the electroconductive hose of the fourth aspect are that it is inexpensive and impermeable to fuel and has good low-temperature properties, and the amount of the vulcanizing agent and its reaction product to be released from it is small. The hose is thus especially suitable for automobiles. In addition, since the hose is hardly charged with static electricity, it will not give sparks dangerous to fuel when it is contacted with a metallic refueling gun or the like.

The above and other advantages of the invention will become more apparent from the following description and the accompanying drawings.

DETAILED DESCRIPTION OF THE INVENTION

Figure 1A:
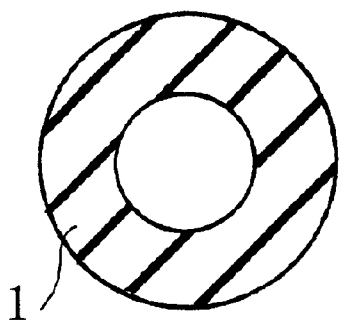
FIGS. 1A to 1D are cross-sectional views showing examples of the hose of low fuel permeation and the electroconductive hose of low fuel permeation of the invention.

Rubber Composition:

The rubber composition of the invention comprises a base of NBR-PVC. The rubber composition of the first aspect contains at least a specific plasticizer, and is used for producing hoses of low fuel permeation, especially those for automobiles. The rubber composition of the third aspect contains at least a specific plasticizer, and has a volume specific resistance controlled to be not higher than a predetermined value. The rubber composition is used for producing electroconductive hoses of low fuel permeation, especially those for automobiles.

Rubber composition of the First Aspect:

The rubber composition of the first aspect contains a specific plasticizer and may contain reinforcing CB. Further, any known vulcanizing agents, vulcanization accelerators, antioxidant agents and others may be added.

The amount of CB that may be in the rubber composition of the first aspect is not specifically defined. However, for the rubber composition for fuel hoses, it is preferable that the amount of the plasticizer and that of CB therein is balanced to thereby control the hardness (JIS K6253 or ISO 48) of the rubber composition to be within a range falling between 55 and 75 degrees. Therefore, the amount of CB in the rubber composition may vary, depending on the amount of the plasticizer therein, the type of CB used and even the combination of the two, and cannot be defined regularly. For example, it may be from 30 to 100 phr (parts per hundred parts of rubber) or so.

Any ordinary vulcanizing agent for NBR-PVC is employable herein, but preferred are low-sulfur vulcanizing agents.

White reinforcing agents such as silica, calcium carbonate and the like may decrease the fuel impermeability of the rubber composition. Tabular crystalline white reinforcing agents such as talc, mica and the like may improve the fuel impermeability of the rubber composition, but will adversely affect the low-temperature properties thereof. Therefore, the addition of these white reinforcing agents to the rubber composition is not preferable.

Rubber Composition of Third Aspect:

The rubber composition of the third aspect contains at least a specific plasticizer and CB to give good fuel impermeability, low-temperature properties and electroconductivity. If desired, any known vulcanizing agents, vulcanization accelerators, antioxidant agents and others may be added thereto. The matters specifically mentioned hereinabove for the vulcanizing agents and the white reinforcing agents in the first aspect also applies to the rubber composition of the third aspect.

The rubber composition of the third aspect has a volume specific resistance of at most $10^8$ Ω·cm. The type and the formulation of CB to be used are not specifically defined, but preferred is CB having a relatively small particle size and a large structure and having a high degree of electroconductivity. Combined with CB or in place of it, any other electroconductive carbon such as acetylene black, Ketchen black or the like may be added to the rubber composition, if desired. In addition, an electroconductive agent except CB may also be added thereto, if it dose not decrease the impermeability of the rubber composition.

NBR-PVC in First Aspect and Third Aspect:

The base of the rubber composition of the first and third aspects is NBR-PVC. The AN content of NBR in NBR-PVC falls between 43 and 50% by weight. Preferably, it falls between 45 and 48% by weight. Except for the definition of its AN content, NBR and PVC are not specifically defined for their types. Any types of ordinarily used NBR and PVC may be blended to form the rubber composition.

The amount of PVC in NBR-PVC for use herein is not specifically defined. In view of ordinary ozone resistance, it is preferable that PVC accounts for from 25 to 40% by weight of the NBR-PVC blend. The amount of PVC smaller than 25% by weight will give poor ozone resistance; and the amount of PVC larger than 40% by weight will affect the workability or the like.

Plasticizer:

In the first aspect, the amount of the plasticizer to be added to NBR-PVC may fall between 15 and 35 phr, and preferably between 20 and 30 phr. In the third aspect, it may fall between 20 and 35 phr, and preferably between 25 and 30 phr. In the two aspects, the plasticizer to be added to the blend has an SP value of at least 8.8, preferably at least 9.0, and has a molecular weight of at most 550, preferably at most 450. Preferred examples of the plasticizer include ether-ester plasticizers such as Asahi Denka Kogyo's ADEKA CIZER RS-107® and ADEKA CIZER RS-540®, which, however, are not limitative. Any plasticizer satisfying the requirements as above is employable herein.

Figure 1C:
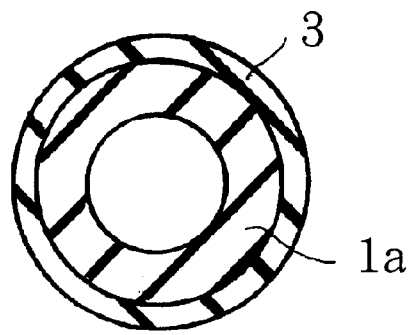
Figure 1B:
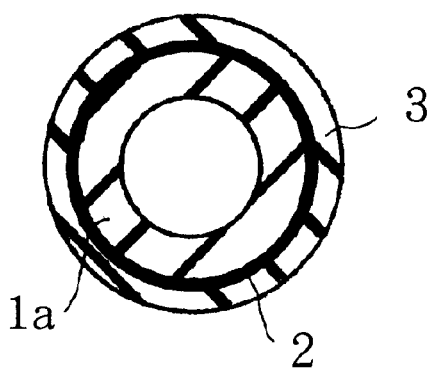
Figure 1D:
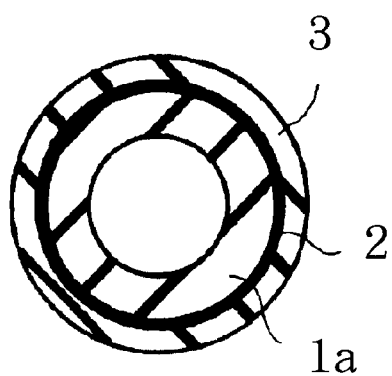

Hose of Low Fuel Permeation of Second Aspect:

The hose of low fuel permeation of the second aspect is formed of the rubber composition of the first aspect. One embodiment of the hose is a single-layered hose 1 as in FIG. 1A. Other embodiments thereof are multi-layered hoses comprising an inner layer 1a of the rubber composition and an outer layer 3 disposed outside the inner layer 1a via or not; via a reinforcing yarn layer 2 therebetween, as in FIGS. 1B to 1D. The outer layer 3 is a single layer in the illustrated embodiments, but may have a multi-layered structure. In the embodiment of FIG. 1B, the outer layer 3 and the inner layer 1a are formed of the same rubber composition. In the embodiments of FIGS. 1C and 1D, the outer layer 3 is formed of a weather-resistant rubber material such as CSM, ECO or the like. In the multi-layered, fuel-transporting hoses of FIGS. 1B to 1D, the material of the inner layer 1a is NBR-PVC having a PVC content of at least 25% by weight.

The hose of low fuel permeation is usable, for example, in fuel piping in automobiles, etc., and is especially suitable for filler hoses, breather hoses and evaporation hoses.

The shape of the hose is not specifically defined, including, for example, straight hoses, bending hoses, and hoses having a bellows configuration in at least a part thereof. Straight hoses are often used for breather hoses, and hoses having a bellows configuration are often used for filler hoses. The diameter of the hose is not specifically defined, either. For example, the hose may be so constituted that its inner diameter falls between 3 and 20 mm and its wall thickness falls between 2 and 4 mm; or its inner diameter falls between 20 and 50 mm and its wall thickness falls between 3 and 5 mm. Preferably, the breather hose has an inner diameter of from 3 to 20 mm and a wall thickness of from 2 to 4 mm; and the filler hose has an inner diameter of from 20 to 50 mm and a wall thickness of from 3 to 5 mm.

Electroconductive Hose of Low Fuel Permeation of Fourth Aspect:

The electroconductive hose of low fuel permeation of the fourth aspect is favorably used for automobiles, especially for filler hoses and breather hoses for automobiles. Its structure may be as shown in FIGS. 1A to 1D, like the hose of low fuel permeation of the second aspect. The difference between the two is that the rubber composition of the first aspect is substituted by that of the third aspect.

The shape of the hose is not specifically defined, and may be the same as that of the hose of the second aspect.

Process for Manufacturing Hoses:

The hose of low fuel permeation of the second aspect and the electroconductive hose of low fuel permeation of the fourth aspect can be manufactured by vulcanizing the rubber composition followed by shaping it into hoses under any ordinary conditions. For example, employable is extrusion molding or injection molding.

However, since the unvulcanized tubular moldings of the rubber composition are often flatted, the following first and second methods will be preferably employed.

The first method is used for manufacturing straight or bending, single-layered or multi-layered hoses, in which a single-layered or multi-layered, unvulcanized hose is first produced through extrusion molding. Next, a straight or bending thin mandrel is inserted into the unvulcanized hose, or the unvulcanized hose is fitted into a straight or bending groove in a heating die. Being kept in that condition, the straight or bending hose is vulcanized. This method is especially suitable for forming breather hoses.

The second method is used for manufacturing straight or bending hoses or hoses having a bellows configuration at least in a part thereof In this method, a straight, bending or partly bellows-configured tubular cavity (with a mandrel inserted therein) is formed in a mold capable of being heated. An unvulcanized rubber material is then injected into the cavity, and then thermally vulcanized by heating the mold. After having been thus vulcanized, the hose is removed from the mold, and it may be further heated in any desired manner to promote its vulcanization. This method is especially suitable for forming filler hoses.

DESCRIPTION OF THE PREFERRED EMBODIMENTS

1. Embodiments of Hoses of Low Fuel Permeation
Formulation of Unvulcanized Rubber Composition First prepared were test pieces of Examples 1 to 8 as in Table 1 below, and test pieces of Comparative Examples 1 to 17 as in Tables 2 to 4 below. Except for that for the test pieces of Comparative Example 1 in Table 2, the basic formulation of the unvulcanized rubber composition for these Examples and Comparative Examples is as follows:
Basic Formulation of Rubber Composition shown by parts by weight:

| | |
|---|---|
| Polymer | 100 wt. pts. |
| Zinc oxide | 5 wt. pts. |
| Stearic acid | 1 wt. pts. |
| Antioxidant agent | 2 wt. pts. |
| CB | variable |
| Plasticizer | variable |
| Sulfur | 0.5 wt. pts. |
| Thiuram-type vulcanization accelerator | 1.5 wt. pts. |
| Sulfenamide-type vulcanization accelerator | 1.5 wt. pts. |

In the above-mentioned basic formulation, the polymer is NBR-PVC. In NBR-PVC, the content of PVC and the AN content of NBR are varied as shown in Tables 1 to 4.

The formulation of FKM for Comparative Example 1 in Table 2 is as follows:
Formulation of FKM:

| | |
|---|---|
| Polymer | 100 wt. pts. |
| Magnesium oxide | 3 wt. pts. |
| Calcium hydroxide | 6 wt. pts. |
| CB | variable |

In the formulation of FKM, the polymer is 3M(Dyneon)'s FLUOREL FE5731Q® which is FKM having a fluorine content of 69%.

The plasticizer in Examples 1 to 5, 7 and 8 and in Comparative Examples 3 to 7 and 10 to 17 is Asahi Denka Kogyo's ADEKA CIZER RS107®, and it has an SP value of 9.2 and a molecular weight of 434. In Example 6, used is Asahi Denka Kogyo's ADEKA CIZER RS700® having an SP value of 8.9 and a molecular weight of 550. In Comparative Example 2, used is DOP having an SP value of 9.0 and a molecular weight of 391. In Comparative Example 8, used is DOA having an SP value of 8.5 and a molecular weight of 371. In Comparative Example 9, used is Asahi Denka Kogyo's ADEKA CIZER RS735® having an SP value of 9.2 and a molecular weight of 850. The amount of each plasticizer used is shown in the following Tables in terms of phr.

CB used is indicated in the Tables, in which HAF is Showa Cabot's SHOW BLACK N330®; FEF is Tokai Carbon's SEAST SO®; and SRF is Tokai Carbon's SEAST S®. The amount of each CB used is shown in the Tables in terms of phr.

To the samples of Examples 1 to 8 and Comparative Examples 1 to 11, no white reinforcing agent is added. To those of Comparative Examples 12 to 17, added is a white reinforcing agent, as in Table 4. The amount of the white reinforcing agent added is also shown in Table 4 in terms of phr. Concretely, silica for the white reinforcing agent is Nippon Silica's NIPSIL ER®; calcium carbonate is Shiraishi Calcium's HAKUENKA CC®; mica is KMG Minerals' CANADA MICA M-200®; talc 1 is Nippon Talc's MICRO ACE K-1®; and talc 2 is Sierra Talc's MISTRON VAPOR®.

The antioxidant agent used is Seiko Chemical's OZONON 3C®, NONFLEX RD®, etc.

Preparation of Test Pieces

As in the formulation indicated above for Examples and Comparative Examples except Comparative Example 1, the unvulcanized NBR-PVC was mixed with the other ingredients and milled in a Banbury mixer and an open roll mill. The resulting, unvulcanized rubber composition was press-vulcanized at 150° C. for 30 minutes to form sheet-like test pieces having a thickness of 2 mm.

For Comparative Example 1, the unvulcanized FKM was milled along with the other ingredients in an open roll mill, as in the formulation indicated above. Then, this was press-vulcanized at 160° C. for 45 minutes to form sheet-like test pieces like those as above.

Evaluation of Physical Properties in Ordinary State

The test pieces were tested for their physical properties in an ordinary state, the tensile strength (MPa), the elongation (%) and the hardness, according to JIS K6251 and K6253, or ISO 37 and 48. The data obtained are given in Tables 1 to 4. For the physical properties in an ordinary state, it is desirable that the tensile strength is at least 10.0 MPa, the elongation is at least 300%, and the hardness falls between 55 and 75 degrees.

Evaluation of Gasoline Permeation—Phase-II gasoline

The test pieces were tested for gasoline permeation according to a CUP method. The method is described concretely with reference to FIG. 2. A cup 5 having an external thread 4 around its outer periphery was set with its opening upward (i.e. opposite to its situation illustrated), and 100 ml of Phase-II gasoline 6 was put into it. The opening of the cup 5 was covered with a test piece 7, and a metal ring 8 for protecting the test piece was laid over the test piece 7 along its periphery. A metal mesh 9 for supporting the test piece was laid over it.

Figure 2:
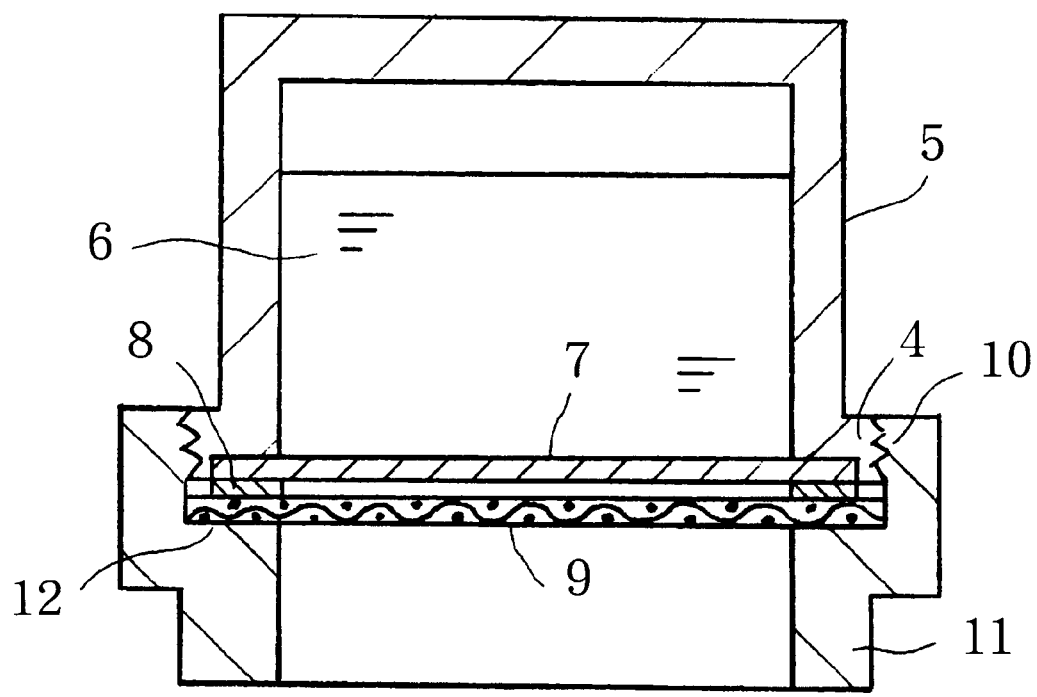
FIG. 2 is a schematic view showing a method of gasoline permeability evaluation employed herein.

Next, a fastening cap 11 having an internal thread 10 around its inner periphery was screwed over the opening of the cup 5. Accordingly, the metal mesh 9, the metal ring 8 and the test piece 7 were tightly pressed against the periphery of the opening of the cup 5 at the step 12, and the opening of the cup 5 was completely sealed. In that condition, the test equipment was turned upside down, as shown in FIG. 2, and kept static as it was.

For pre-treating it, the test piece was dipped in gasoline at 40° C. for 7 days in the manner as above (one surface dipping). Next, the gasoline in the cup was exchanged for a fresh one, and immediately the total weight W0 (mg) of the test equipment was measured. The test piece was further dipped in gasoline at 40° C. for 3 days, and the total weight W1 (mg) of the test equipment was again measured. From the thus-measured data W0 and W1, the permeation coefficient (mg·mm/cm$^2$/day) of the test piece was calculated according to the following formula (1). In formula (1), t indicates the thickness (mm) of the test piece; and A indicates the contact area (cm$^2$) of the test piece to gasoline, or that is, the area of the test piece through which gasoline has permeated.

$$\text{Permeation Coefficient}=[(W0-W1)\times t/3A] \quad (1)$$

The permeation coefficient of each test piece thus obtained is given in Tables 1 to 4. The permeation coefficient should preferably be at most 10.

Evaluation of Gasoline Permeation—Gasoline for Evaluation in Europe

In the same manner as above, the test pieces were tested for gasoline permeation using gasoline for evaporation control evaluation in Europe. The permeation coefficient of each test piece is given in Tables 1 to 4. The permeation coefficient should preferably be at most 30. In Table 5, shown are the details of the Phase-II gasoline for evaluation in the United States and the gasoline for evaluation in Europe.

Evaluation of Low-temperature Properties

The low-temperature impact test according to JIS K6261 or ISO 812 was carried out to measure the brittle temperature (° C.) of each test piece. The data obtained are given in Tables 1 to 4. The brittle temperature should preferably be not higher than −20° C.

Evaluation of Ozone Resistance, Bleeding Resistance and Workability

The test pieces were tested for their ozone resistance, bleeding resistance and workability. Briefly, for their bleeding resistance, the test pieces were, after having been vulcanized, left at room temperature for one week, and their surfaces were checked for the presence or absence of bleeding thereout. For their workability, the test pieces were checked as to how the constituent ingredients could be readily mixed and milled in the Banbury mixer or in the roll mill and how the blends could be readily extrusion-molded into hoses. The test data obtained are given in Tables 1 to 4. For their ozone resistance, the test pieces were tested in the manner mentioned below, according to JIS K6259 or ISO 1431. Concretely, the test pieces were first dipped in Fuel C at 40° C. for 48 hours, and then dried in vacuum at 40° C. for 48 hours. Then, they were stretched to 140% in length; exposed to air containing 50 pphm of ozone for 168 hours; and checked as to whether or not they had cracks.

Evaluation of Extraction in Fuel

The test pieces of Examples and Comparative Examples 1 to 3 were tested for their extraction in fuel. Briefly, 20 g of each test piece was cut into chips of 2 mm×2 mm, and the chips were dipped in 200 ml of Fuel B (JIS K6258, ISO 1817) at 40° C. for 168 hours. The Fuel B (in which the chips were thus dipped) was concentrated to be 10 ml in volume, and then centrifuged in a centrifugal tube. The resulting supernatant liquid was removed, and the residue was dried up to be a solid. The weight of the solid residue was measured, and its ratio (wt. %) to the sample (20 g) was obtained. The data are given in the following Tables. The residue should preferably be up to 0.2% by weight.

TABLE 1

|  | 1 | 2 | 3 | 4 | 5 | 6 | 7 | 8 |
| --- | --- | --- | --- | --- | --- | --- | --- | --- |
| Amount of ACN | 46 | 43 | 50 | 46 | 46 | 46 | 46 | 46 |
| Amount of PVC | 30 | 30 | 30 | 25 | 40 | 30 | 30 | 30 |
| Plasticizer, SP value | 9.2 | 9.2 | 9.2 | 9.2 | 9.2 | 8.9 | 9.2 | 9.2 |
| Plasticizer, molecular weight | 434 | 434 | 434 | 434 | 434 | 550 | 434 | 434 |
| Plasticizer, amount added (phr) | 25 | 25 | 25 | 25 | 25 | 25 | 15 | 35 |
| Carbon Grade | HAF | HAF | HAF | HAF | HAF | HAF | HAF | HAF |
| Amount of Carbon added (phr) | 35 | 35 | 35 | 35 | 35 | 35 | 25 | 55 |
| White Reinforcing Agent | — | — | — | — | — | — | — | — |
| Amount of White Reinforcing Agent added | 0 | 0 | 0 | 0 | 0 | 0 | 0 | 0 |
| Physical Properties in ordinary state |  |  |  |  |  |  |  |  |
| Tensile Strength (MPa) | 16.0 | 14.5 | 18.5 | 16.5 | 15.5 | 15.8 | 18.8 | 14.5 |
| Elongation (%) | 500 | 500 | 380 | 520 | 470 | 480 | 350 | 520 |
| Hardness | 70 | 65 | 75 | 71 | 72 | 68 | 73 | 72 |
| Gasoline Permeation (Phase-II gasoline) Permeation Coefficient (mg · mm/cm$^2$/day) | 3.0 | 9.8 | 1.2 | 2.8 | 3.2 | 4.1 | 1.8 | 8.7 |
| Gasoline Permeation (gasoline for evaluation in Europe) Permeation Coefficient (mg · mm/cm$^2$/day) | 14.5 | 29.1 | 8.4 | 14.2 | 15.9 | 18.8 | 11.7 | 27.0 |
| Brittle Temperature (° C.) | −27 | −30 | −21 | −27 | −23 | −21 | −22 | −30 |
| Ozone Resistance | OK | OK | OK | OK | OK | OK | OK | OK |
| Bleeding Resistance | OK | OK | OK | OK | OK | OK | OK | OK |
| Workability | OK | OK | OK | OK | OK | OK | OK | OK |
| Extraction in Fuel (wt. %) | 0.05 | 0.13 | 0.02 | 0.05 | 0.04 | 0.05 | 0.04 | 0.04 |

TABLE 2

|  | 1 | 2 | 3 |
|---|---|---|---|
| Amount of ACN | terFKM having F | 35 | 40 |
| Amount of PVC | content of 69% | 30 | 30 |
| Plasticizer, SP value | — | 9.0 | 9.2 |
| Plasticizer, molecular weight | — | 391 | 434 |
| Plasticizer, amount added (phr) | — | 30 | 25 |
| Carbon Grade | SRF | FEF | FEF |
| Amount of Carbon added (phr), FEF | 15 | 65 | 70 |
| White Reinforcing Agent | — | — | — |
| Amount of White Reinforcing Agent added | — | 0 | 0 |
| Physical Properties in ordinary state | | | |
| Tensile Strength (MPa) | 12.5 | 14.5 | 12.5 |
| Elongation (%) | 350 | 510 | 500 |
| Hardness | 70 | 68 | 71 |
| Gasoline Permeation (Phase-II gasoline) Permeation Coefficient (mg · mm/cm²/day) | 0.7 | 80.5 | 28.0 |
| Gasoline Permeation (gasoline for evaluation in Europe) Permeation Coefficient (mg · mm/cm²/day) | 0.7 | 120 | 61.6 |
| Brittle Temperature (° C.) | −20 | −32 | −30 |
| Ozone Resistance | OK | OK | OK |
| Bleeding Resistance | OK | OK | OK |
| Workability | OK | OK | OK |
| Extraction in Fuel (wt. %) | 0 | 0.3 | 0.22 |

TABLE 3

|  | 4 | 5 | 6 | 7 | 8 | 9 | 10 | 11 |
|---|---|---|---|---|---|---|---|---|
| Amount of ACN | 42 | 52 | 46 | 46 | 46 | 46 | 46 | 46 |
| Amount of PVC | 30 | 30 | 20 | 45 | 30 | 30 | 30 | 30 |
| Plasticizer, SP value | 9.2 | 9.2 | 9.2 | 9.2 | 8.5 | 9.2 | 9.2 | 9.2 |
| Plasticizer, molecular weight | 434 | 434 | 434 | 434 | 371 | 850 | 434 | 434 |
| Plasticizer, amount added (phr) | 25 | 25 | 25 | 25 | 25 | 25 | 10 | 40 |
| Carbon Grade | HAF | HAF | HAF | HAF | HAF | HAF | HAF | HAF |
| Amount of Carbon added (phr), FEF | 35 | 35 | 35 | 35 | 35 | 35 | 20 | 60 |
| White Reinforcing Agent | — | — | — | — | — | — | — | — |
| Amount of White Reinforcing Agent added | 0 | 0 | 0 | 0 | 0 | 0 | 0 | 0 |
| Physical Properties in ordinary state | | | | | | | | |
| Tensile Strength (MPa) | 14.5 | 20.5* | 16.8 | 15.0* | 20.3* | 18.5* | 19.5 | 12.9 |
| Elongation (%) | 520 | 350 | 520 | 480 | 350 | 400 | 370 | 510 |
| Hardness | 67 | 80 | 72 | 76 | 82 | 76 | 75 | 75 |
| Gasoline Permeation (Phase-II gasoline) Permeation Coefficient (mg · mm/cm²/day) | 17 | 0.9* | 2.6 | 3.5* | 1.5* | 6.0* | 1.3 | 14.1 |
| Gasoline Permeation (gasoline for evaluation in Europe) Permeation Coefficient (mg · mm/cm²/day) | 48.2 | 6.6* | 15.0 | 14.0* | 9.5* | 25.3* | 8.8 | 36.7 |
| Brittle Temperature (° C.) | −32 | −14* | −28 | −19* | −12* | −15* | −16 | −32 |
| Ozone Resistance | OK | OK* | 72 hrs cracked | OK* | OK* | OK* | OK | OK* |
| Bleeding Resistance | OK | NG | OK | NG | NG | NG | OK | NG |
| Workability | OK | NG | OK | NG | NG | OK* | OK | NG |

(*) As the plasticizer bled out, these are reference data.

TABLE 4

|  | 12 | 13 | 14 | 15 | 16 | 17 |
|---|---|---|---|---|---|---|
| Amount of ACN | 46 | 46 | 46 | 46 | 46 | 46 |
| Amount of PVC | 30 | 30 | 30 | 30 | 30 | 30 |
| Plasticizer, SP value | 9.2 | 9.2 | 9.2 | 9.2 | 9.2 | 9.2 |
| Plasticizer, molecular weight | 434 | 434 | 434 | 434 | 434 | 434 |
| Plasticizer, amount added (phr) | 25 | 25 | 25 | 25 | 25 | 25 |
| Carbon Grade | HAF | HAF | HAF | HAF | HAF | HAF |
| Amount of Carbon added (phr), FEF | 20 | 20 | 20 | 20 | 20 | 10 |
| White Reinforcing Agent | silica | calcium carbonate | mica | talc 1 | talc 2 | talc 2 |

TABLE 4-continued

|  | 12 | 13 | 14 | 15 | 16 | 17 |
|---|---|---|---|---|---|---|
| Amount of White Reinforcing Agent added | 20 | 30 | 30 | 30 | 30 | 50 |
| Physical Properties in ordinary state | | | | | | |
| Tensile Strength (MPa) | 14.2 | 12.0 | 10.8 | 13.2 | 13.5 | 10.2 |
| Elongation (%) | 450 | 420 | 450 | 380 | 420 | 360 |
| Hardness | 70 | 68 | 68 | 69 | 68 | 73 |
| Gasoline Permeation (Phase-II gasoline) Permeation Coefficient (mg · mm/cm$^2$/day) | 12.0 | 20.5 | 2.1 | 2.7 | 2.8 | 1.8 |
| Gasoline Permeation (gasoline for evaluation Europe) Permeation Coefficient (mg · mm/cm$^2$/day) | 40.0 | 51.2 | 12.0 | 16.3 | 16.5 | 11.4 |
| Brittle Temperature (° C.) | −18 | −14 | −12 | −15 | −16 | −10 |
| Ozone Resistance | OK | OK | OK | OK | OK | OK |
| Bleeding Resistance | OK | OK | OK | OK | OK | OK |
| Workability | OK | OK | NG | OK | OK | NG |

TABLE 5

|  | Phase-II Gasoline | Gasoline for evaporation control evaluation in Europe | Method for Measurement |
|---|---|---|---|
| Reid Vapor Pressure (38.7° C.) [KPa] | 45.5 | 59.0 | JIS K2258 |
| Aromatics [vol. %] | 23.0 | 38.4 | JIS K2536 |
| Olefins [vol. %] | 5.0 | 7.3 | JIS K2536 |
| MTBE [vol. %] | 11.0 | 0 | JIS K2536 |

2. Embodiments of Electroconductive Hoses of Low Fuel Permeation

Formulation of Unvulcanized Rubber Composition

First prepared was test pieces of Examples 1 to 13 as in Tables 6 and 7 below, and test pieces of Comparative Examples 1 to 20 as in Tables 8 to 10 below. Except for that for the test pieces of Comparative Example 1 in Table 8, the basic formulation of the unvulcanized rubber composition for these Examples and Comparative Examples is as follows:

Basic Formulation of Rubber Composition:

| Polymer | 100 wt. pts. |
|---|---|
| Zinc oxide | 5 wt. pts. |
| Stearic acid | 1 wt. pts. |
| Antioxidant agent | 2 wt. pts. |
| CB | variable |
| Plasticizer | variable |
| Sulfur | 0.5 wt. pts. |
| Thiuram-type vulcanization accelerator | 1.5 wt. pts. |
| Sulfenamide-type vulcanization accelerator | 1.5 wt. pts. |

In the above-mentioned basic formulation, the polymer is NBR-PVC. In NBR-PVC, the content of PVC and the AN content of NBR are varied, as in Tables 6 to 10. The vulcanization accelerators are Ouchi Shinko Chemical's NOCCELER TT-G® and NOCCELLER CZ-G®

The formulation of FKM for Comparative Example 1 in Table 8 is the same as that for Comparative Example 1 in Table 2.

The plasticizer in Examples 1 to 5, 7 to 13 and in Comparative Examples 3 to 7 and 10 to 20 is Asahi Denka Kogyo's ADEKA CIZER RS107®, and it has an SP value of 9.2 and a molecular weight of 434. In Example 6, used is Asahi Denka Kogyo's ADEKA CIZER RS700® having an SP value of 8.9 and a molecular weight of 550. In Comparative Example 2, used is DOP having an SP value of 9.0 and a molecular weight of 391. In Comparative Example 8, sued is DOA having an SP value of 8.5 and a molecular weight of 371. In Comparative Example 9, used is Asahi Denka Kogyo's ADEKA CIZER RS735® having an SP value of 9.2 and a molecular weight of 850. The amount of each plasticizer used is shown in the following Tables in terms of phr.

CB used is indicated in the Tables, in which HAF is Showa Cabot's SHOW BLACK N330®; FEF is Tokai Carbon's SEAST SO®; and FT is Asahi Carbon's ASAHI THERMAL®. The amount of each CB used is shown in the Tables in terms of phr.

To the samples of some Examples and Comparative Examples, added is acetylene black or Ketchen black as electroconductive carbon, in place of or in addition to CB. Precisely, to the samples of Examples 8, 9, 11 and 12, added is Denki Kagaku Kogyo's ACETYLENE BLACK®. This is expressed as acetylene in the Tables, and its amount is in terms of phr therein. To the samples of Examples 10 and 13 and Comparative Example 19, added is Ketchen International's KETCHEN BLACK EC®. This is expressed as Ketchen in the Tables, and its amount is in terms of phr therein.

To the samples of Examples 1 to 12 and Comparative Examples 1 to 11 and 18 to 20, no white reinforcing agent is added. To those of Example 13, and Comparative Examples 12 to 17, added is a white reinforcing agent, as in Table 9. The amount of the white reinforcing agent added is also shown in Table 9 in terms of phr. Concretely, silica for the white reinforcing agent is Nippon Silica's NIPSIL ER®; calcium carbonate is Shiraishi Calcium's HAKUENKA CC®; mica is KMG Minerals' CANADA MICA M-200®; talc 1 is Nippon Talc's MICRO ACE K-1®; and talc 2 is Sierra Talc's MISTRON VAPOR®.

The antioxidant agent used is Seiko Chemical's OZO-NON 3C®, NONFLEX RD®, etc.

Preparation of Test Pieces

As in the formulation indicated above for Examples and Comparative Examples except Comparative Example 1, the unvulcanized NBR-PVC was mixed with the other ingredients and milled in a Banbury mixer and an open roll mill. The resulting, unvulcanized rubber composition was press-vulcanized at 150° C. for 30 minutes to form sheet-like test pieces having a thickness of 2 mm.

For Comparative Example 1, the unvulcanized FKM was milled along with the other ingredients in an open roll mill, as in the formulation indicated above. Then, this was press-vulcanized at 160° C. for 45 minutes to form sheet-like test pieces like those as above.

Evaluation of Physical Properties in Ordinary State

The test pieces were tested for their physical properties in an ordinary state, the tensile strength (MPa), the elongation (%) and the hardness, according to JIS K6251 and K6253, or ISO 37 and 48. The data obtained are given in Tables 6 to 10. For the physical properties in an ordinary state, it is desirable that the tensile strength is at least 10.0 MPa, the elongation is at least 300%, and the hardness falls between 55 and 75 degrees.

Evaluation of Gasoline Permeation—Phase-II Gasoline

The test pieces were tested for gasoline permeation according to a CUP method in which was used Phase-II gasoline. The details of the test method and those for calculating the permeation coefficient are the same as in the previous section 1, Embodiments of Hoses of Low Fuel Permeation. The permeation coefficient of each test piece thus obtained is given in Tables 6 to 10. The permeation coefficient should preferably be at most 10.

Evaluation of Gasoline Permeation—Gasoline for Evaluation in Europe

In the same manner as in the previous section 1, Embodiments of Hoses of Low Fuel Permeation, the test pieces were tested for gasoline permeation using gasoline for evaporation control evaluation in Europe. The permeation coefficient of each test piece is given in Tables 6 to 10. The permeation coefficient should preferably be at most 30.

Evaluation of Low-temperature Properties

According to the low-temperature impact test in JIS K6261 or ISO 812, the brittle temperature (° C.) of the test pieces was measured. The data obtained are given in Tables 6 to 10. The brittle temperature should preferably be not higher than −20° C.

Measurement of Volume Specific Resistance

According to JIS K6911 or IEC 93, volume specific resistance ($\Omega \cdot cm$) of the test pieces was measured. The voltage applied to each test piece was one V. The data obtained are given in Tables 6 to 10. The volume specific resistance should preferably be at most $10^8$ $\Omega \cdot cm$.

Evaluation of Ozone Resistance, Bleeding Resistance and Workability

The test pieces were tested for their ozone resistance, bleeding resistance and workability. The test methods are the same as in the previous section 1, Embodiments of Hoses of Low Fuel Permeation. The test data obtained are given in Tables 6 to 10.

Evaluation of Extraction in Fuel

The test pieces of Examples and Comparative Examples 1 to 3 were tested for their extraction in fuel, according to the same method as in the previous section 1, Embodiments of Hoses of Low Fuel Permeation. The data obtained are given in the following Tables. The residue should preferably be up to 0.2% by weight.

TABLE 6

|  | 1 | 2 | 3 | 4 | 5 | 6 | 7 | 8 |
| --- | --- | --- | --- | --- | --- | --- | --- | --- |
| Amount of ACN | 46 | 43 | 50 | 46 | 46 | 46 | 46 | 46 |
| Amount of PVC | 30 | 30 | 30 | 25 | 40 | 30 | 30 | 30 |
| Plasticizer, SP value | 9.2 | 9.2 | 9.2 | 9.2 | 9.2 | 8.9 | 9.2 | 9.2 |
| Plasticizer, molecular weight | 434 | 434 | 434 | 434 | 434 | 550 | 434 | 434 |
| Plasticizer, amount added (phr) | 25 | 25 | 25 | 25 | 25 | 25 | 35 | 25 |
| Carbon Grade | HAF | HAF | HAF | HAF | HAF | HAF | FEF | — |
| Amount of Carbon added (phr) | 35 | 35 | 35 | 35 | 35 | 35 | 55 | — |
| Electroconductive Carbon Grade | — | — | — | — | — | — | — | acetylene |
| Amount of Electroconductive Carbon added (phr) | — | — | — | — | — | — | — | 35 |
| White Reinforcing Agent | — | — | — | — | — | — | — | — |
| Amount of White Reinforcing Agent added | 0 | 0 | 0 | 0 | 0 | 0 | 0 | 0 |
| Physical Properties in ordinary state |  |  |  |  |  |  |  |  |
| Tensile Strength (MPa) | 16.6 | 14.5 | 18.5 | 16.5 | 15.5 | 15.8 | 14.2 | 16.5 |
| Elongation (%) | 500 | 500 | 380 | 520 | 470 | 480 | 550 | 510 |
| Hardness | 70 | 65 | 75 | 71 | 72 | 68 | 69 | 68 |
| Gasoline Permeation (Phase-II gasoline) Permeation Coefficient (mg · mm/cm$^2$/day) | 3.0 | 9.8 | 1.2 | 2.8 | 3.2 | 4.1 | 9.1 | 3.1 |
| Gasoline Permeation (gasoline for evaluation in Europe) Permeation Coefficient (mg · mm/cm$^2$/day) | 14.5 | 29.1 | 8.4 | 14.2 | 15.9 | 18.8 | 28.2 | 14.6 |
| Brittle Temperature (° C.) | −27 | −30 | −21 | −27 | −23 | −21 | −30 | −25 |
| Ozone Resistance | OK | OK | OK | OK | OK | OK | OK | OK |
| Volume Specific Resistance ($\Omega$cm) | $1 \times 10^7$ | $5 \times 10^7$ | $7 \times 10^6$ | $3 \times 10^7$ | $8 \times 10^6$ | $1 \times 10^7$ | $1 \times 10^6$ | $3 \times 10^6$ |
| Bleeding Resistance | OK | OK | OK | OK | OK | OK | OK | OK |
| Workability | OK | OK | OK | OK | OK | OK | OK | OK |
| Extraction in Fuel (wt. %) | 0.05 | 0.13 | 0.02 | 0.05 | 0.04 | 0.05 | 0.13 | 0.05 |

TABLE 7

|  | 9 | 10 | 11 | 12 | 13 |
|---|---|---|---|---|---|
| Amount of ACN | 46 | 46 | 46 | 46 | 46 |
| Amount of PVC | 30 | 30 | 30 | 30 | 30 |
| Plasticizer, SP value | 9.2 | 9.2 | 9.2 | 9.2 | 9.2 |
| Plasticizer, molecular weight | 434 | 434 | 434 | 434 | 434 |
| Plasticizer, amount added (phr) | 25 | 25 | 20 | 25 | 25 |
| Carbon Grade | HAF | HAF | HAF | FEF | HAF |
| Amount of Carbon added (phr) | 25 | 25 | 20 | 25 | 20 |
| Electroconductive Carbon Grade | acetylene | ketchen | acetylene | acetylene | ketchen |
| Amount of Electroconductive Carbon added (phr) | 10 | 5 | 10 | 10 | 5 |
| White Reinforcing Agent | — | — | — | — | talc 2 |
| Amount of White Reinforcing Agent added | 0 | 0 | 0 | 0 | 10 |
| Physical Properties in ordinary state | | | | | |
| Tensile Strength (MPa) | 16.2 | 15.5 | 16.5 | 15.2 | 13.4 |
| Elongation (%) | 780 | 510 | 420 | 520 | 450 |
| Hardness | 71 | 72 | 73 | 71 | 71 |
| Gasoline Permeation (Phase-II gasoline) Permeation Coefficient (mg · mm/cm$^2$/day) | 2.9 | 2.9 | 1.8 | 3.2 | 2.6 |
| Gasoline Permeation (gasoline for evaluation in Europe) Permeation Coefficient (mg · mm/cm$^2$/day) | 14.2 | 14.2 | 11.4 | 15.8 | 14.9 |
| Brittle Temperature (° C.) | −25 | −24 | −22 | −26 | −21 |
| Ozone Resistance | OK | OK | OK | OK | OK |
| Volume Specific Resistance (Ωcm) | $7 \times 10^6$ | $2 \times 10^6$ | $7 \times 10^7$ | $1 \times 10^8$ | $8 \times 10^7$ |
| Bleeding Resistance | OK | OK | OK | OK | OK |
| Workability | OK | OK | OK | OK | OK |
| Extraction in Fuel (wt. %) | 0.05 | 0.05 | 0.05 | 0.05 | 0.05 |

TABLE 8

|  | 1 | 2 | 3 | 4 | 5 | 6 | 7 |
|---|---|---|---|---|---|---|---|
| Amount of ACN | terFKM having F content of 69% | 35 | 40 | 42 | 52 | 46 | 46 |
| Amount of PVC |  | 30 | 30 | 30 | 30 | 20 | 45 |
| Plasticizer, SP value | — | 9.0 | 9.2 | 9.2 | 9.2 | 9.2 | 9.2 |
| Plasticizer, molecular weight | — | 391 | 434 | 434 | 434 | 434 | 434 |
| Plasticizer, amount added (phr) | — | 30 | 25 | 25 | 25 | 25 | 25 |
| Carbon Grade | SRF | FEF | FEF | HAF | HAF | HAF | HAF |
| Amount of Carbon added (phr) | 15 | 65 | 70 | 35 | 35 | 35 | 35 |
| Electroconductive Carbon Grade | — | — | — | — | — | — | — |
| Amount of Electroconductive Carbon added (phr) | 0 | 0 | 0 | — | — | — | — |
| White Reinforcing Agent | — | — | — | — | — | — | — |
| Amount of White Reinforcing Agent added | — | 0 | 0 | 0 | 0 | 0 | 0 |
| Physical Properties in ordinary state | | | | | | | |
| Tensile Strength (MPa) | 12.5 | 14.5 | 12.5 | 14.5 | 20.5* | 16.8 | 15.0* |
| Elongation (%) | 350 | 510 | 500 | 520 | 350 | 520 | 480 |
| Hardness | 70 | 68 | 71 | 67 | 80 | 72 | 76 |
| Gasoline Permeation (Phase-II gasoline) Permeation Coefficient (mg · mm/cm$^2$/day) | 0.7 | 80.5 | 28.0 | 17 | 0.9* | 2.6 | 3.5* |
| Gasoline Permeation (gasoline for evaluation in Europe) Permeation Coefficient (mg · mm/cm$^2$/day) | 0.7 | 120 | 61.6 | 48.2 | 6.6* | 15.0 | 14.0* |
| Brittle Temperature (° C.) | −20 | −32 | −30 | −32 | −14* | −28 | −19* |
| Ozone Resistance | OK | OK | OK | OK | OK* | 72 hrs cracked | OK* |
| Volume Specific Resistance (Ωcm) | $1 \times 10^{11}$ | $1 \times 10^9$ | $8 \times 10^7$ | $8 \times 10^8$ | $8 \times 10^{6*}$ | $3 \times 10^7$ | $1 \times 10^{7*}$ |
| Bleeding Resistance | OK | OK | OK | OK | NG | OK | NG |
| Workability | OK | OK | OK | OK | NG | OK | NG |
| Extraction in Fuel (wt. %) | 0 | 0.3 | 0.22 | not tested | not tested | not tested | not tested |

(*) As the plasticizer bled out, these are reference data.

TABLE 9

|  | 8 | 9 | 10 | 11 | 12 | 13 | 14 | 15 |
|---|---|---|---|---|---|---|---|---|
| Amount of ACN | 46 | 46 | 46 | 46 | 46 | 46 | 46 | 46 |
| Amount of PVC | 30 | 30 | 30 | 30 | 30 | 30 | 30 | 30 |
| Plasticizer, SP value | 8.5 | 9.2 | 9.2 | 9.2 | 9.2 | 9.2 | 9.2 | 9.2 |
| Plasticizer, molecular weight | 371 | 850 | 434 | 434 | 434 | 434 | 434 | 434 |
| Plasticizer, amount added (phr) | 25 | 25 | 10 | 40 | 25 | 25 | 25 | 25 |
| Carbon Grade | HAF | HAF | HAF | HAF | HAF | HAF | HAF | HAF |
| Amount of Carbon added (phr) | 35 | 35 | 20 | 60 | 20 | 20 | 20 | 20 |
| Electroconductive Carbon Grade | — | — | — | — | — | — | — | — |
| Amount of Electroconductive Carbon added (phr) | — | — | — | — | — | — | — | — |
| White Reinforcing Agent | — | — | — | — | silica | calcium carbonate | mica | talc 1 |
| Amount of White Reinforcing Agent added | 0 | 0 | 0 | 0 | 20 | 30 | 30 | 30 |
| Physical Properties in ordinary state | | | | | | | | |
| Tensile Strength (MPa) | 20.3* | 18.5* | 19.5 | 12.9 | 14.2 | 12.0 | 10.8 | 13.2 |
| Elongation (%) | 350 | 400 | 370 | 510 | 450 | 420 | 450 | 380 |
| Hardness | 82 | 76 | 75 | 75 | 70 | 68 | 68 | 69 |
| Gasoline Permeation (Phase-II gasoline) Permeation Coefficient (mg · mm/cm$^2$/day) | 1.5* | 6.0* | 1.3 | 14.1 | 12.0 | 20.5 | 2.1 | 2.7 |
| Gasoline Permeation (gasoline for evaluation in Europe) Permeation Coefficient (mg · mm/cm$^2$/day) | 9.5* | 25.3* | 8.8 | 36.7 | 40.0 | 51.2 | 12.0 | 16.3 |
| Brittle Temperature (° C.) | −12* | −15* | −16 | −32* | −18 | −14 | −12 | −15 |
| Ozone Resistance | — | OK* | OK | OK* | OK | OK | OK | OK |
| Volume Specific Resistance (Ωcm) | 5 × 10$^6$ | 8 × 10$^6$ | 1 × 10$^{10}$ | 4 × 10$^5$ | 2 × 10$^{10}$ | 4 × 10$^{10}$ | 3 × 10$^{10}$ | 3 × 10$^{10}$ |
| Bleeding Resistance | NG | NG | OK | NG | OK | OK | OK | OK |
| Workability | NG | OK* | OK | NG | OK | OK | NG | OK |

(*) As the plasticizer bled out, these are reference data.

TABLE 10

|  | 16 | 17 | 18 | 19 | 20 |
|---|---|---|---|---|---|
| Amount of ACN | 46 | 46 | 46 | 46 | 46 |
| Amount of PVC | 30 | 30 | 30 | 30 | 30 |
| Plasticizer, SP value | 9.2 | 9.2 | 9.2 | 9.2 | 9.2 |
| Plasticizer, molecular weight | 434 | 434 | 434 | 434 | 434 |
| Plasticizer, amount added (phr) | 25 | 25 | 25 | 25 | 25 |
| Carbon Grade | HAF | HAF | FT | HAF | FEF |
| Amount of Carbon added (phr) | 20 | 10 | 50 | 10 | 35 |
| Electroconductive Carbon Grade | — | — | — | ketchen | — |
| Amount of Electroconductive Carbon added (phr) | — | — | — | 15 | — |
| White Reinforcing Agent | talc 2 | talc 2 | — | — | — |
| Amount of White Reinforcing Agent added | 30 | 50 | — | — | — |
| Physical Properties in ordinary state | | | | | |
| Tensile Strength (MPa) | 13.5 | 10.2 | 11.5 | 18.5 | 16.2 |
| Elongation (%) | 420 | 360 | 380 | 240 | 540 |
| Hardness | 68 | 73 | 68 | 82 | 70 |
| Gasoline Permeation (Phase-II gasoline) Permeation Coefficient (mg · mm/cm$^2$/day) | 2.8 | 1.8 | 2.2 | 3.5 | 3.1 |
| Gasoline Permeation (gasoline for evaluation in Europe) Permeation Coefficient (mg · mm/cm$^2$/day) | 16.5 | 11.4 | 12.2 | 14.3 | 14.0 |
| Brittle Temperature (° C.) | −16 | −10 | −23 | −17 | −27 |
| Ozone Resistance | OK | OK | OK | OK | OK |
| Volume Specific Resistance (Ωcm) | 2 × 10$^{10}$ | 5 × 10$^{10}$ | 5 × 10$^9$ | 8 × 10$^5$ | 4 × 10$^8$ |
| Bleeding Resistance | OK | OK | OK | OK | OK |
| Workability | OK | NG | OK | NG | OK |

While the preferred embodiments have been described, variations thereto will occur to those skilled in the art within the scope of the present inventive concepts which are delineated by the following claims.

What is claimed is:

1. A rubber composition for hoses of low fuel permeation, which comprises NBR having a combined acrylonitrile content (AN content) of from 43 to 50% by weight, PVC blended with the NBR, and a plasticizer having a solubility parameter (SP) value of at least 8.8 and a molecular weight of at most 550 added to the NBR-PVC blend.

2. The rubber composition as claimed in claim 1, wherein the AN content of the NBR is from 45 to 48% by weight.

3. The rubber composition as claimed in claim 1, wherein the amount of the plasticizer is from 15 to 35 parts by weight relative to 100 parts by weight of the polymer component of the rubber composition.

4. The rubber composition as claimed in claim 1, wherein the amount of the plasticizer is from 20 to 30 parts by weight relative to 100 parts by weight of the polymer component of the rubber composition.

5. The rubber composition as claimed in claim 1, wherein the content of the PVC is from 25 to 40% by weight of the NBR-PVC blend.

6. A hose of low fuel permeation, which comprises the rubber composition of claim 1.

7. The hose as claimed in claim 6, which is a filler hose, a breather hose or an evaporation hose for fuel transportation in automobiles.

8. A rubber composition for electroconductive hoses of low fuel permeation, which comprises NBR having a combined acrylonitrile content (AN content) of from 43 to 50% by weight, PVC blended with the NBR, a plasticizer having a solubility parameter (SP) value of at least 8.8 and a molecular weight of at most 550 added to the NBR-PVC blend, and CB added to the NBR-PVC blend to lower the volume specific resistance of the blend to at most $10^8$ Ω·cm.

9. The rubber composition as claimed in claim 8, wherein the AN content of the NBR is from 45 to 48% by weight.

10. The rubber composition as claimed in claim 8, wherein the SP value of the plasticizer is at least 9.0.

11. The rubber composition as claimed in claim 8, wherein the molecular weight of the plasticizer is at most 450.

12. The rubber composition as claimed in claim 8, wherein the amount of the plasticizer is from 20 to 35 parts by weight relative to 100 parts by weight of the polymer component of the rubber composition.

13. The rubber composition as claimed in claim 8, wherein the amount of the plasticizer is from 25 to 30 parts by weight relative to 100 parts by weight of the polymer component of the rubber composition.

14. The rubber composition as claimed in claim 8, wherein the content of the PVC is from 25 to 40% by weight of the NBR-PVC blend.

15. An electroconductive hose of low fuel permeation, which comprises the rubber composition of claim 8.

16. The electroconductive hose as claimed in claim 15, which is a filler hose, a breather hose or an evaporation hose for fuel transportation in automobiles.

17. A hose of low fuel permeation, which has a single-layered structure of the rubber composition of claim 1.

18. A hose of low fuel permeation, and which comprises an inner layer of the rubber composition of claim 1 where the content of the PVC is at least 25% by weight of the NBR-PVC blend, and a single-layered or multi-layered outer layer disposed outside the inner layer via or not via a reinforcing yarn layer therebetween.

19. An electroconductive hose of low fuel permeation which has a single-layered structure of the rubber composition of claim 8.

20. An electroconductive hose of low fuel permeation, which comprises an inner layer of the rubber composition of claim 10 where the content of the PVC is at least 25% by weight of the NBR-PVC blend, and a single-layered or multi-layered outer layer disposed outside the inner layer via or not via a reinforcing yarn layer therebetween.

* * * * *